(12) United States Patent
Strange et al.

(10) Patent No.: US 6,468,317 B1
(45) Date of Patent: *Oct. 22, 2002

(54) METHOD FOR IMPROVED IMPREGNATION OF ELECTROLYTIC CAPACITORS WITH A POLYMER BASED ELECTROLYTE

(75) Inventors: Thomas F. Strange, Easley, SC (US); Timothy R. Marshall, Pickens, SC (US); Dean F. Carson, Mountain View, CA (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,452

(22) Filed: Jan. 6, 2000

(51) Int. Cl.[7] ............................. H01G 9/00; H01G 9/02
(52) U.S. Cl. ..................... 29/25.03; 361/523; 361/525
(58) Field of Search ........................... 29/25.01–25.03; 361/523, 525, 528–30

(56) References Cited

U.S. PATENT DOCUMENTS

| | | | |
|---|---|---|---|
| 4,593,343 A | 6/1986 | Ross ........................... 361/433 |
| 5,086,374 A | 2/1992 | MacFarlane et al. ........ 361/525 |
| 5,131,388 A | 7/1992 | Pless et al. ............. 128/419 D |
| 5,143,591 A | 9/1992 | Shaffer ......................... 205/50 |
| 5,146,391 A | 9/1992 | MacFarlane et al. ........ 361/525 |
| 5,153,820 A | 10/1992 | MacFarlane et al. ........ 361/525 |
| 5,522,851 A | 6/1996 | Fayram ......................... 607/5 |
| 5,585,039 A | 12/1996 | Matsumoto et al. ........ 252/500 |
| 5,616,274 A | 4/1997 | Kanbara et al. ........... 252/62.2 |
| 5,659,457 A | 8/1997 | Lian et al. ................... 361/502 |
| 5,693,433 A | 12/1997 | Zhukovskiy et al. ........ 429/192 |
| 5,729,428 A | * 3/1998 | Sakata et al. ................ 361/523 |
| 5,748,439 A | 5/1998 | MacFarlane et al. ........ 361/525 |
| 5,801,917 A | 9/1998 | Elias .......................... 361/53.5 |
| 5,814,082 A | 9/1998 | Fayram et al. ................. 607/5 |
| 5,903,382 A | 5/1999 | Tench et al. ................. 359/265 |
| 6,028,065 A | * 2/2000 | Ragunathan et al. ........ 514/178 |
| 6,063,522 A | 5/2000 | Hamrock et al. ............ 429/200 |
| 6,086,642 A | 7/2000 | Fukaumi et al. ............ 29/25.03 |
| 6,275,373 B1 | 8/2001 | Marshall et al. ............. 361/526 |
| 6,287,630 B1 | 9/2001 | Strange et al. ................ 427/80 |

* cited by examiner

Primary Examiner—Ha Tran Nguyen
(74) Attorney, Agent, or Firm—Steven M. Mitchell

(57) ABSTRACT

The present invention relates to an improved method of impregnating electrolytic capacitor stacks or wound rolls with a polymer based electrolyte, such as a hydroxyethylmethacrylate (HEMA) or hydroxyethylacrylate (HEA) based electrolyte, to render them suitable for use in electrolytic capacitors, and to such electrolytic capacitors. The initiator to promote the polymerization of the polymer based electrolyte and a surface active wetting agent are deposited on the foil or in the stack or wound roll prior to impregnation of the stack or wound roll with a polymer based electrolyte, allowing the polymer based electrolyte solution to be warmed prior to impregnation to a temperature suitable for easy impregnation into the anode and cathode foil and paper. Polymerization does not begin until impregnation of the capacitor with the polymer based electrolyte and the surfactant allows the polymer based electrolyte to more fully incorporate itself into the microscopic features of the anode foil.

11 Claims, No Drawings

METHOD FOR IMPROVED IMPREGNATION OF ELECTROLYTIC CAPACITORS WITH A POLYMER BASED ELECTROLYTE

CROSS-REFERENCE TO RELATED APPLICATIONS

This application claims priority to U.S. patent application Ser. No. 09/312,202, filed May 14, 1999, now U.S. Pat. No. 6,287,630, U.S. patent application Ser. No. 09/458,549, filed Dec. 9, 1999, now U.S. Pat. No. 6,275,373 and U.S. patent application Ser. no. 09/458,584, filed Dec. 9, 1999, all of which are incorporated herein by reference.

BACKGROUND OF THE INVENTION

1. Field of the Invention

The present invention relates to an improved method of impregnating electrolytic capacitor stacks or wound rolls with a polymer based electrolyte, such as a hydroxyethylmethacrylate (HEMA) or hydroxyethylacrylate (HEA) based electrolyte, to render them suitable for use in electrolytic capacitors, and to such electrolytic capacitors.

2. Related Art

Conventionally, an electrolytic capacitor includes an etched aluminum foil anode, an aluminum foil or film cathode, and an interposed kraft paper or fabric gauze separator impregnated with a solvent-based liquid electrolyte. Typically, the electrolytic or ion-producing component of the electrolyte is a salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween. While aluminum electrolytic capacitors having anodes and cathodes comprised of aluminum foil are most common, foils of other conventional valve metals such as titanium, tantalum, magnesium, niobium, zirconium and zinc are also used.

In known processes for impregnating electrolytic capacitor stacks or wound rolls with a polymer based electrolyte, a polymerization initiator, such as a persulfate salt of the alkyl or ammonium families, is mixed with the polymer based electrolyte prior to impregnation. For example, U.S. Pat. No. 5,628,801 to MacFarlane et al. discloses an electrolytic capacitor where a separator impregnated with an elastomeric solid electrolyte is utilized in the dual capacity of electrolyte and adhesive material to hold together the anode and cathode plates of the capacitor. The preferred electrolyte consists of: 17.5 parts by weight of hydroxyethylmethacrylate, 32.5 parts by weight ethylene glycol, 7.0 parts by weight ammonium adipate, 6.7 parts by weight ammonium glutarate, 0.45 parts by weight tetraethyleneglycoldiacrylate, and 2.2 parts by weight of initiator solution. The capacitor assembly is impregnated with this polymerizable liquid electrolyte/adhesive and then heated to approximately 55° C. for at least 2 hours, but preferably 24 hours to cure the electrolyte/adhesive.

Similarly, U.S. Pat. No. 5,748,439 to MacFarlane et al. discloses an electrolytic capacitor having interposed between the electrically conductive anode and cathode layers thereof a spacer comprised of a mechanical separator means such as kraft paper impregnated with a crosslinked elastomeric electrolyte. The polymer based electrolyte is preferably made up as a liquid prepolymer electrolyte mixture prior to impregnation into the capacitor element and the polymer is preferably formed in situ thereafter from the prepolymer mixture. The mixture is preferably made up by first dissolving a salt into a liquid plasticizer component by stirring at elevated temperatures, cooling the mixture to room temperature, and then adding to the mixture a monomer corresponding to the desired polymer and a crosslinking agent, as well as a polymerization initiator.

The problem with the previous processes for impregnating electrolytic capacitors with a polymer based electrolyte is the incomplete filling of the microscopic tunnels in the etched anodes. Polymerization begins as soon as the polymerization initiator is mixed with the polymer based electrolyte, increasing the viscosity of the initiator/polymer based electrolyte solution and reducing the working pot life to approximately 15 to 30 minutes. Because of the increased viscosity and the reduced working time, the polymer based electrolyte has insufficient time to fully incorporate itself into the microscopic features of the etched anode. Capacitance is lost due to the incomplete usage of the increased area of the etched foil.

SUMMARY OF THE INVENTION

The present invention provides an improved method of impregnating electrolytic capacitor stacks or wound rolls with a polymer based electrolyte, such as a HEMA or HEA based electrolyte, allowing complete filling of the microscopic tunnels in the etched anodes. According to the present invention, the electrolytic capacitor is first impregnated with a polymerization initiator and a surfactant or surface active wetting agent prior to impregnating the capacitor with the polymer based electrolyte. Polymerization does not begin until impregnation of the capacitor with the polymer based electrolyte. The surfactant allows the polymer based electrolyte to more fully incorporate itself into the microscopic features of the anode foil.

The process according to the present invention results in a fully impregnated capacitor stack or wound roll. Accordingly, the present invention provides improved methods and compositions for impregnating electrolytic capacitor stacks or wound rolls, as well as electrolytic capacitors comprising such stacks or wound rolls.

DETAILED DESCRIPTION OF THE INVENTION

The present invention provides for an improved method of impregnating electrolytic capacitor stacks or wound rolls with a polymer based electrolyte, such as a HEMA or HEA based electrolyte. This process improves the incorporation of the polymer based electrolyte into the anode foil, thereby increasing capacitance.

Prior to impregnating the electrolytic capacitor with a polymer based electrolyte, the etched and formed anode foil is pre-loaded with a polymerization initiator and a surfactant or surface active wetting agent, including, but not limited to, Dioctyl sodium sulfosuccinate (docusate sodium). Other surfactants that can be used include Lauric acid and Stearic acid. In the case of a liquid surfactant, the surfactant can be added directly to the fill electrolyte and just pre-impregnate the capacitor with the polymerization initiator alone. One example of a liquid surfactant is N-octyl alcohol added to the fill electrolyte in a proportion of 1 to 2% by weight. The polymerization initiator is preferably an aqueous solution containing a persulfate ($S_2O_8^{-2}$) salt, typically an alkyl or ammonium salt, such as potassium persulfate, ammonium persulfate or sodium persulfate. Other free radical initiators are suitable as well, such as azoxyisobutyronitrile(AIBN) or benzoyl peroxide. The polymerization initiator and surface active wetting agent may be incorporated into the anode foil by means of soaking the anode foil or capacitor stack in a dilute aqueous solution of a persulfate salt and a surface active wetting agent, or by other means know to those skilled in the art. The preferred initiator/surfactant solution is 0.75% docusate sodium, approximately 10% $K_2S_2O_8$ in an aqueous solution. Some of the water may be replaced with a polar organic solvent with a high vapor pressure such as ethanol to make it easier to dry. However, solubility can be a problem in the lower water solutions. The present invention improves the incorporation of the polymer into the anode foil, by locating the polymerization initiator and surface active wetting agent in intimate contact with the areas where polymerization is desired (as in the anode foil tunnels, paper, or cathode structure).

Separating the persulfate salt from the polymer based electrolyte solution allows the polymer based electrolyte solution to be heated without causing premature polymerization. Polymerization does not begin to occur until contact is made with the polymerization initiator, which occurs upon impregnation of the capacitor with the polymer based electrolyte. Heating the polymer based electrolyte reduces the viscosity of the polymer based electrolyte solution and lessens resistance when the polymer based electrolyte solution is filling the voids of the anode foil. Additionally, the surfactant allows the polymer based electrolyte solution to more thoroughly fill the microscopic tunnel structures of the etched anode foil. To reduce the drying time, the polymerization initiator/surfactant solution may also contain either a low boiling point alcohol or ketone of 5 or less carbons, such as methanol, ethanol, acetone, methylethyl ketone, or toluene. Impregnation of the anode foil with the polymerization initiator/surfactant may be done prior to the construction of the capacitor or as a precursor to the impregnation of a constructed capacitor with the polymer based electrolyte.

The pre-loaded anode foil or constructed capacitor is then vacuum dried at room temperature (15 to 35° C.) to prevent the premature break down of the persulfate salt into the sulfate ion. If the capacitor stack has not already been constructed, the anodes are cut and the capacitor assembled.

A polymer based electrolyte solution is prepared by adding a polymer matrix of a hydrogel to a standard solvent-based fill electrolyte, in an oxygen limited atmosphere where the total oxygen concentration is less than 2%. The polymer matrix may be based on the family of acrylate monomers, such as hydroxyethylmethacrylate (HEMA) or hydroxyethylacrylate (HEA), or may be based on polyvinylalcohol or polyacrylonitrile. A hydrogel is a water-swollen network of hydrophilic homopolymers or copolymers, commonly formed by the free radical polymerization of a vinyl monomer in the presence of a difunctional crosslinking agent and a swelling agent. The solvent-based fill electrolyte may be any of the various fill electrolytes known to those skilled in the art as suitable for use in electrolytic capacitor manufacture. A typical solvent-based fill electrolyte is a mixture of a weak acid and a salt of a weak acid, preferably a salt of the weak acid, in a polyhydroxy alcohol solvent. The solvents for the fill electrolyte can include ethylene glycol, propylene glycol, 1-methyl-2-pyrrolidone, gammabutyrolactone, dimethylformamide, dimethyl acetamide and mixtures of these materials and the like, as would be apparent to one of ordinary skill in the relevant art. The preferred solvent based fill electrolyte can be any of the standard fill electrolytes known to those skilled in the art as suitable for use in electrolytic capacitor manufacture. A typical fill electrolyte that is used consists of ethylene glycol and/or proplyene glycol solution containing boric acid, a long chain dicarboxylic acid, a base such as an amine or ammonia, a depolarizing agent, and a small amount of water. The preferred fill electrolyte consists of an ethylene glycol solution with 3 to 9% Azelaic acid, preferably 6%; 0.25 to 2% boric acid, preferably 1.0%; up to 2.0% nitroacetophenone, preferably 1.0%; with sufficient ammonium hydroxide and gaseous ammonia added to produce a fill electrolyte with a pH of 6.8 to 7.5, preferably 7.2; and a preferred water content of 2.0%. The preferred polymer based electrolyte solution is prepared by adding a polymer matrix based on 2-hydroxyethyl methacrylate, to the solvent-based fill electrolyte, with a ratio of 30 to 80% by weight HEMA, preferably 40% by weight HEMA.

The polymer based electrolyte solution may also contain a compound for crosslinking such as, but not limited to, tetraethyleneglycoldiacrylate (TEGDA). For example, the addition of 1.0%±0.5% TEGDA to the polymer based electrolyte solution may be used for crosslinking of the polymer. Alternative divinyl cross-linkers include ethylene glycol dimethacrylate (EGDMA) and diethylene glycol dimethacrylate (DEGDMA). Strong electron beam exposure or other such techniques known to those skilled in the art can also be used to control crosslinking of the polymer.

The polymer based electrolyte solution is warmed to a temperature of 50 to 80° C., with a preferred temperature of 70° C., to decrease viscosity and allow for increased penetration into the microscopic features in the anode foil. The pre-loaded capacitor is then vacuum impregnated with the warmed polymer based electrolyte solution, by placing the capacitor in contact with the warmed polymer based electrolyte solution and reducing the pressure to less than 50 cm Hg. The capacitor is held at this low pressure for 5 to 45 minutes with a preferred time of 15 minutes, and then pressure is restored, using the restored pressure to force the warmed polymer based electrolyte solution into the microscopic structures of the capacitor inherent in the anode and cathode foils and separator paper where the polymerization initiator and surface active wetting agent have been previously impregnated.

The polymer based electrolyte is cured by placing the capacitor in a 75 to 90° C. oven with a preferred temperature of 80° C. and a maximum oxygen atmospheric concentration of 2% for a period of 2 to 24 hours, with a preferred time of 4 hours, to break down the persulfate salt and allow complete polymerization to take place. The capacitor is then aged in a normal manner by applying the working voltage to the capacitor, allowing the capacitor to reach this voltage, and then allowing the current to decrease.

This method of impregnation improves the incorporation of the polymer based electrolyte into the anode foil which therefor increases the capacitance. Three advantageous aspects of the invention allow this goal to be accomplished. First, by separating the polymerization initiator from the polymer based electrolyte solution, the polymer based electrolyte solution can be heated to reduce the viscosity of the polymer based electrolyte solution. Heating the polymer based electrolyte solution lessens resistance when the polymer based electrolyte solution is filling the voids of the anode foil, allowing for increased penetration into the microscopic features in the anode foil. The second advantage of separating the persulfate salt from the polymer based electrolyte solution is to increase the working pot life. Polymerization does not begin to occur until impregnation of the capacitor with the polymer based electrolyte solution. The third advantage of the method according to the present invention is that by preloading the capacitor with a surface active wetting agent, the polymer based electrolyte solution is able to more fully incorporate itself into the microscopic features of the anode foil. The surfactant allows the polymer based electrolyte solution to more thoroughly fill the microscopic tunnel structures of the etched anode foil. An additional benefit of the method of impregnation according to the present invention is the elimination of the need for a separate chemical to break down the persulfate salt, as the increased temperature will accomplish the same break down.

The process of the present invention results in a fully impregnated capacitor stack or wound roll. Thus, stacks or wound rolls impregnated in accordance with the present invention can be used in high voltage electrolytic capacitors and can yield a significantly higher capacitance and working life.

The present invention thus also provides for electrolytic capacitors comprising stacks or wound rolls impregnated by methods and/or compositions according to the present invention. Such capacitors can be made using any suitable method known in the art. Non-limiting examples of electrolytic capacitors and methods of their manufacture are disclosed, e.g., in the following references which are entirely incorporated herein by reference: U.S. Pat. No. 5,814,082 to Fayram et al., U.S. Pat. No. 5,801,917 to Elias, U.S. Pat. No. 5,131,388 to Pless, et al., and U.S. Pat. No. 4,593,343 to Ross.

For example, a flat capacitor according to the present invention can be constructed of anode and cathode layers, stacked with a paper insulator or spacer between each layer. The anode layer can be composed of one or more anode foils stacked together without any paper spacer, to form a high energy density anode element. The anode and cathode layers are then grouped together respectively in a parallel connection to produce sufficient capacitance for the intended function. This finished stack is inserted into a case with a geometry closely following the contour of the stack, and designed to minimize the space occupied inside the finished defibrillator.

In a second embodiment of the present invention, the design of the very high volt electrolytic capacitor may be a traditionally designed rolled capacitor in either a cylindrical or flattened cylindrical shape. The anode foil has a lower capacitance per square centimeter of projected area than the first design due to the fact that the anode foil must have enough strength to be rolled. Very thin rolls of aluminum or other valve metal foil are used as the anode and cathode layers, with a separator interposed therebetween. The entire laminate is rolled up into the form of a substantially cylindrical body or wound roll, held together with adhesive tape and encase, with the aid of suitable insulation, in an aluminum tube or canister.

Electrolytic capacitors according to the present invention can be incorporated into implantable medical devices, such as implantable cardiac defibrillators (ICDs), as would be apparent to one skilled in the art, as described in U.S. Pat. No. 5,522,851 issued to Fayram.

Having now generally described the invention, the same will be more readily understood through reference to the following examples which are provided by way of illustration, and are not intended to be limiting of the present invention.

EXAMPLE 1

An aqueous persulfate/surfactant solution of docusate sodium (0.100g), 4.0 g $K_2S_2O_{8(sat.)}$, and enough $H_2O$ to make 14 g was mixed. A capacitor was impregnated with the persulfate/surfactant solution and vacuum dried. The capacitor was then vacuum impregnated with a warmed HEMA based electrolyte solution. The composition of the electrolyte consisted of 38.5% HEMA, 0.6% TEGDA, and 60.9% standard fill electrolyte consisting of an ethylene glycol solution with 6.0% Azelaic acid, 1.0% boric acid, 1.0% nitroacetophenone, and enough ammonium hydroxide/gaseous ammonia added to produce a fill electrolyte with a pH of 7.2 and a water content of 2.0%. The capacitor was then cured in an oven and aged.

The capacitor showed no sign of polymerization until after the capacitor was placed in contact with the polymer based electrolyte solution. This experiment showed that the method according to the present invention allows the polymer based electrolyte solution to be heated, to reduce viscosity and improve impregnation into the anode and cathode foil and paper, without hastening the curing of the polymer. On disassembly of the capacitors, complete polymerization was observed. By impregnating the capacitor first with persulfate and a surface active wetting agent, the polymer based electrolyte solution can be heated outside the capacitor and then impregnated in the capacitor without polymerization occurring outside the capacitor. The surfactant allows the polymer based electrolyte solution to more fully fill the microscopic tunnel structures of the etched foil.

All references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for impregnating an electrolytic capacitor stack or wound roll, comprising
   (a) first impregnating said stack or wound roll with a solution comprising a polymerization initiator and a surface active wetting agent;
   (b) contacting said stack or wound roll with a polymer based electrolyte; and
   (c) curing said polymer,
wherein said step (a) is performed prior to said step (b) to allow said polymer based electrolyte to substantially incorporate into microscopic structures inherent to said stack or wound roll.

2. A process according to claim 1, wherein said polymer initiator is a solution consisting of an aqueous solution of an initiator compound, along with a miscible organic solvent of high vapor pressure.

3. A process according to claim 2, wherein said initiator compound is a persulfate ($S_2O_8^{-2}$).

4. A process according to claim 1, wherein said surface active wetting agent is docusate sodium.

5. A process according to claim 1, wherein said polymer based electrolyte is a hydroxyethylmethacrylate (HEMA) or hydroxyethylacrylate (HEA) based electrolyte.

6. A process according to claim 5, wherein said HEMA or HEA based electrolyte is a solution of an ethylene glycol based electrolyte mixed with HEMA or HEA and a crosslinking compound.

7. A process according to claim 6, wherein said crosslinking compound is tetraethyleneglycoldiacrylate (TEGDA).

8. A process according to claim 6, wherein said HEMA or HEA based electrolyte solution has a ratio between 20% and 60% by weight HEMA or HEA.

9. A process according to claim 6, wherein said HEMA or HEA based electrolyte solution has no more than 1% of said crosslinking compound.

10. A process according to claim 5, wherein said HEMA or HEA based electrolyte is heated to a temperature of 90° C. before impregnating said stack or wound roll.

11. A process for impregnating an electrolytic capacitor stack or wound roll, comprising:

(a) impregnating said stack or wound roll with a polymerization initiator and a surface active wetting agent;

(b) drying said stack or wound roll under a vacuum at a temperature of 15 to 35° C.;

(c) placing said stack or wound roll in an environment with an oxygen concentration not more than 2%;

(d) preparing a polymer based electrolyte solution and heating said solution to a temperature in the range of from 50° C. to 80° C.;

(e) placing said stack or wound roll in a vacuum chamber and reducing the pressure to a suitable vacuum to remove trapped gases;

(f) contacting said stack or wound roll with said heated polymer based on electrolyte solution and restoring the pressure in the chamber so that the restored pressure pushes said heated polymer based electrolyte solution into microscopic structures inherent to said stack or wound roll where said polymerization initiator has been previously impregnated; and (g) placing said stack or wound roll into a heated environment which excludes the presence of oxygen at a temperature of 75° C. to 90° C. for about 2 to 24 hours until the polymerization of said polymer electrolyte has fully taken place.

* * * * *